United States Patent [19]
Trigon et al.

[11] 3,916,414
[45] Oct. 28, 1975

[54] ANTENNA SYSTEM FOR PRIMARY AND SECONDARY RADAR

[75] Inventors: Roland Trigon; Georges Cohen, both of Paris, France

[73] Assignee: Thomson-CSF, Paris, France

[22] Filed: Feb. 19, 1974

[21] Appl. No.: 443,869

[30] Foreign Application Priority Data
Sept. 7, 1973 France .............................. 73.32296

[52] U.S. Cl. ............. 343/727; 343/5 LS; 343/6.5 R; 343/100 LE; 343/779; 343/783
[51] Int. Cl.² ...................... G01S 9/56; H01Q 19/14
[58] Field of Search ........... 343/729, 730, 786, 858, 343/5 LS, 6.5 R, 100 LE, 727, 779

[56] References Cited
UNITED STATES PATENTS
2,846,678  8/1958  Best ................................... 343/840
3,665,481  5/1972  Low et al. ............................ 343/786

*Primary Examiner*—Eli Lieberman
*Attorney, Agent, or Firm*—Karl F. Ross; Herbert Dubno

[57] ABSTRACT

A common antenna system for a primary and a secondary radar transceiver is described. The primary feeder connected to the primary transceiver is provided with two probes for transmitting and receiving through it the interrogation signals of the secondary transceiver. Two ancillary feeders are mounted on either side of the primary structure to transmit and receive a side lobe suppression signal for the secondary transceiver. The feed system is located at the focus of a reflector common to both primary and secondary transceivers.

10 Claims, 5 Drawing Figures

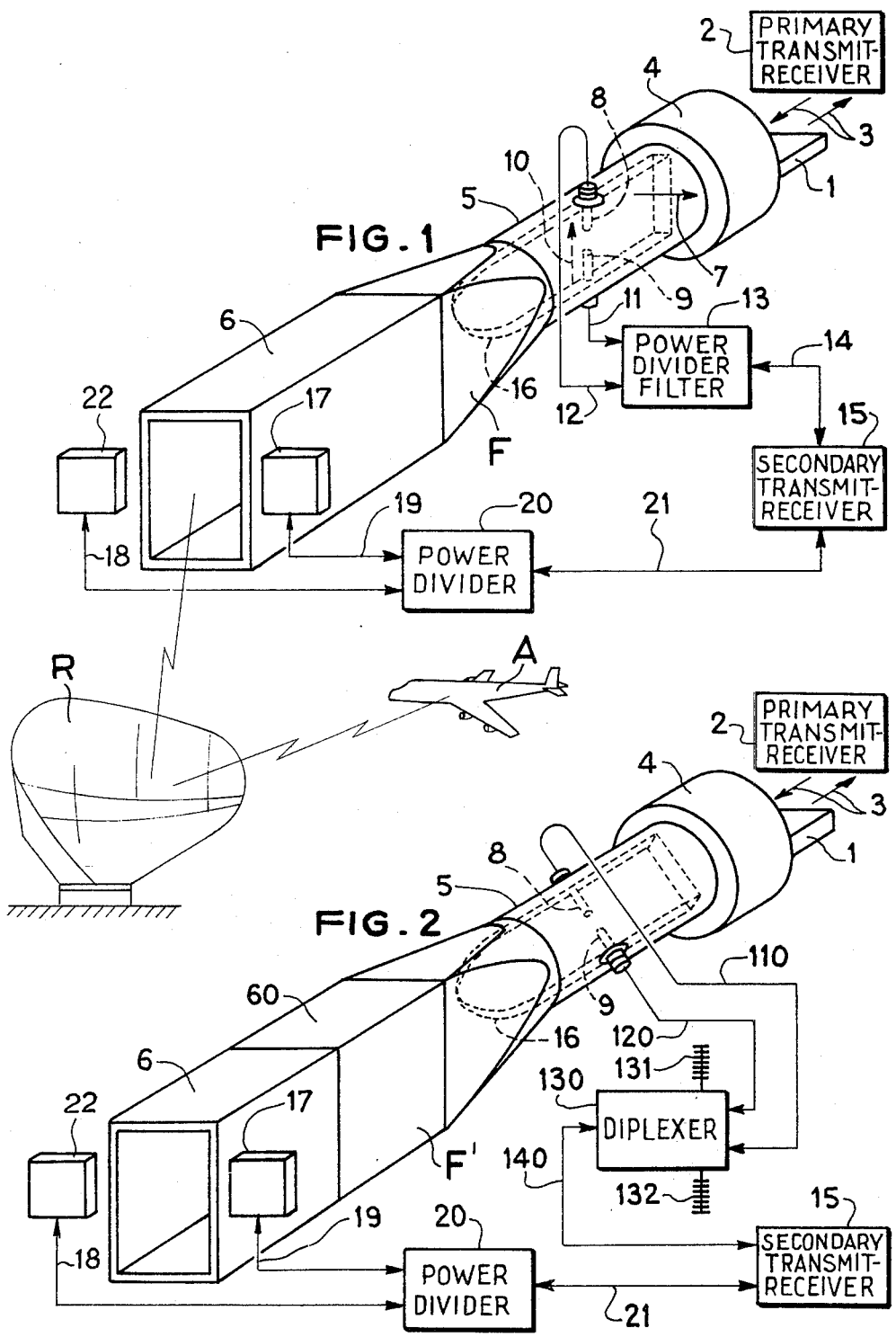

3,916,414

ANTENNA SYSTEM FOR PRIMARY AND SECONDARY RADAR

BACKGROUND OF THE INVENTION.

This invention relates to antenna systems for primary and secondary radar transceivers at stations dealing mainly with the surveillance of aerial traffic. The object of a primary radar transceiver is to detect the presence in the sky of an object and to provide information on this object such as its distance, and possibly its speed, and, depending on the type of antenna employed, its azimuth and/or its elevation. A secondary radar transceiver enables an item of identifying information to be ascertained for the object, and possibly its altitude when it is an aircraft fitted with a transponder designed for this purpose.

The antenna system of a radar station of this type generally comprises one antenna for the primary radar and one or two antennas for the secondary radar. In practice present-day secondary radars have to be able to transmit and receive two different signals. The first is termed the interrogation signal and is transmitted and received by a first antenna. The second is termed the side-lobe-suppression (SLS) signal since it is used for eliminating side-lobe interrogations. In other words, its purpose is to prevent any interrogation of aircraft located in directions other than that of the main lobe of the radiation pattern of the interrogating antenna.

The SLS signal is transmitted and received either by the interrogating antenna or by another antenna of the omnidirectional type.

In the first case the interrogating antenna is fed by the SLS signals in a differential way so that its radiation pattern is of a difference type in azimuth and covers the secondary lobes of the antenna when used for interrogation. In the second case the gain of the separate omnidirectional antenna must be greater than that of the interrogating antenna in the direction of the side lobes yet very much less in the direction of the main lobe.

Known antenna systems of this type thus comprise a number of separate antennas. Besides the encumbrance and extra weight that the presence of two or three separate antennas involves, there often remain, despite the efforts made to prevent this, certain directions in which the radiation pattern of the SLS antenna fails to exercise its inhibiting function. This is particularly the case when the patterns are disturbed by the presence, even though unobtrusive, of a radome.

OBJECTS OF THE INVENTION.

An object of our invention is to avoid these drawbacks by providing an antenna system with a single antenna having a feed structure which is capable of operating in the three ways described above and a single reflector which is used for all three signals to be transmitted.

A related object is to provide means in such a system for reducing the level of the secondary lobes of the interrogation diagram, and increasing in the level of the main lobe, which enables the emitted power of the secondary radar to be reduced for both interrogation and SLS.

SUMMARY OF THE INVENTION

We realize these objects, in accordance with our present invention, by the provision of a primary feeder at the focus of a reflector and a pair of ancillary feeders facing the reflector on opposite sides of the primary feeder, the latter comprising in succession a rectangular waveguide connected to the primary radar transceiver, a matching waveguide, a circular waveguide with a cylindrical section, and a rectangular horn extending therefrom toward the reflector. The two ancillary feeders, connected via a power divider to the secondary radar transceiver for energization thereby with phase-opposed control signals to be radiated toward the reflector, are symmetrically positioned with reference to the rectangular horn. Two probes arranged at diametrically opposite locations in the cylindrical section of the circular waveguide, connected to the secondary radar transceiver for exchanging interrogation signals therewith, have a common axis which includes an angle of not more than about 45° with the planes of the major sides of the rectangular horn. Depending on the mode of polarization of outgoing primary radar waves arriving at the circular waveguide through the adjoining matching guide, the axis of the probe will be either parallel or inclined to the planes of the major horn surfaces.

According to a further feature of our invention, propagation of lower-frequency interrogation signals through the circular waveguide is improved by the insertion therein of a flat dielectric plate with major faces parallel to the common probe axis and with a midplane including that common axis, the plate having a longitudinal dimension in the axial direction of the cylindrical waveguide section.

BRIEF DESCRIPTION OF DRAWINGS.

These and other features of our invention will now be described in detail with reference to the accompanying drawing in which:

FIG. 1 is a perspective view of an embodiment of the feed structure of an antenna according to the invention which operates with linear polarization;

FIG. 2 is a similar view of an embodiment of the feed structure of an antenna which operates with circular polarization;

Figure 3:
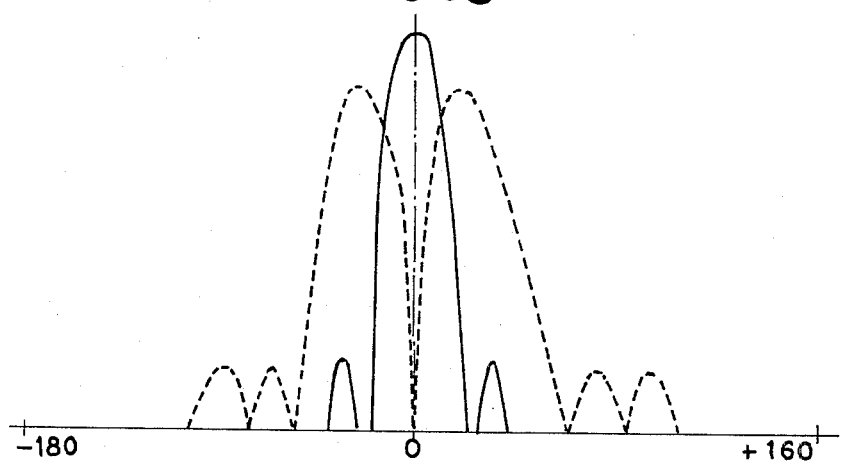
FIG. 3 is a diagram showing the configuration of the radiation patterns for the interrogation and SLS signals in a system according to our invention

SPECIFIC DESCRIPTION.

FIG. 1 shows an embodiment of an antenna system according to the invention. A feed structure F is placed at the focus of a reflector R. An object A is detected and interrogated by means of the antenna system including that single reflector and its associated feed structure serving to transmit both the primary and the secondary radar signals.

This feed structure F comprises, in succession, a section of rectangular waveguide 1 connected to the transmitter/receiver 2 of the primary radar, a matching waveguide 4, a section of circular guide 5 and a horn 6 of rectangular cross section. The connection between this structure and the transmitter/receiver 2 is shown schematically by two arrows 3. In reality it is formed by a length of waveguide fitted with a rotary joint which allows the antenna to revolve about a vertical axis.

The primary radar waves have a linear polarization and the polarization vector is shown by arrow 7. The waves pass, upon transmission, through the structure from the rectangular guide 1 to the horn 6, whence they are radiated to the reflector R and emitted towards the object A. Upon reception the waves are focused by the reflector and propagated through the structure in the opposite direction.

Two probes 8 and 9 are arranged in the circular guide 5 for transmitting and receiving the interrogation signals which are polarized in a direction at right angles to that of the waves for the primary radar, as shown by vector 10. The probes are arranged in diametrically opposite positions, in a cylindrical section of the circular waveguide, and have a common axis which is perpendicular to the polarization direction of the waves for the primary radar and therefore parallel to the major sides of the rectangular horn 6. These probes are connected to the transmitter/receiver 15 of the secondary radar. They are fed in phase opposition by a hybrid circuit 13 which comprises a power divider and a filter. Circuit 13 is connected to the secondary transmitter/receiver 15 by a coaxial line 14 and probes 8 and 9 are connected to circuit 13 by two coaxial lines 12 and 11 respectively. The purpose of the filter in hybrid circuit 13 is to suppress signals having the frequency of the primary radar and to transmit only the interrogation signals of lower frequency. In practice, since the horn 6 and the circular guide 5 are common to the waves of the primary and secondary radars, a fraction of the energy of the primary radar signals may be transmitted towards the secondary transceiver 15 by the probes. These signals are then suppressed in the hybrid circuit 13. Moreover, the coaxial lines 11 and 12 are of a length such that the disturbance caused by the presence of waves of the primary-radar frequency is kept to a minimum.

The dimensions of the guide 5 are calculated so that the structure will operate properly at the frequency of the primary radar. Since the operating frequency of the secondary radar is usually lower than that of the primary radar, guide 5 is too small for the waves of the secondary radar. A flat dielectric plate 16, with a longitudinal dimension extending in axial direction of waveguide 5, is therefore positioned inside the guide for improving the propagation of the waves for the secondary radar. The shape of the dielectric plate is calculated so as not to alter the performance of the primary-source at the primary radar frequencies. The plane of symmetry or midplane of that plate is coincident with the plane containing the axis of the circular waveguide and the common axis of the probes. The large faces of the plate are therefore perpendicular to the vector of polarization of the primary-radar waves so that they will have the smallest thickness to traverse. Conversely, the plate presents a maximum thickness to interrogation waves. On its end proximal to the horn 6 the outline of the plate is elliptical while its opposite end, nearer the guide 4, is chamfered. The plate is made from polypropylene which is a substance which has a low loss gradient and is easy to machine.

The signals of the primary radar and the interrogation signals are thus radiated by the same horn 6 which illuminates the reflector R.

The reflector R may be of the double-curvature type for example. It is highly directional in azimuth and its elevation diagram is nearly a squared cosecant function. The mode of operation when interrogating thus takes advantage of the good characteristics of the common reflector as regards gain and directivity, and this enables a less powerful transmitter/receiver to be used to give the same performance as known systems.

The control signals are transmitted and received by two auxiliary feeders 17 and 22 positioned on either side of the horn 6, in a symmetrical fashion with respect to the axis of the main feed structure F and oriented for radiating towards the reflector R. These ancillary feeders are connected to the secondary radar transceiver 15 via a power-divider circuit 20 and via coaxial lines 18 and 19 between the feeders and the divider, on the one hand, and co-axial line 21 between the divider and the transmitter/receiver 15, on the other hand.

In order that the polar diagram of the control signals is of the difference type, (i.e. have zero gain along the axis of the main lobe of the interrogation diagram, the feeders 22 and 17 are energized in phase opposition. The axes of the two feeders do, of course, lie in a common horizontal plane with the axis of the feeder F. Once again, it is the same reflector of the radar antenna which is illuminated by the control signals of the ancillary feeders. The polar diagram for the control signals is thus of the difference type in azimuth and of the squared cosecant type in elevation as a result of the reflector characteristics.

Figure 5:
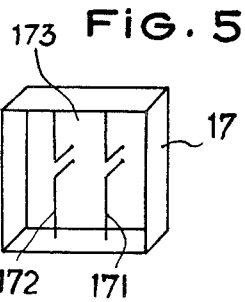
FIG. 5 is a diagrammatic view of an ancillary feeder forming part of the systems of FIGS. 1 and 2.

The feeder 22 is identical with the feeder 17 which is represented in FIG. 5. Each is formed, for example, by a pair of dipoles 171 and 172 arranged in a sealed housing. The metal floor 173 of the housing performs the function of a reflecting plane. The wave-permeable cover of the housing is made of polyester glass, for example. The dipoles 171 and 172 are both oriented in a vertical direction and spaced apart by a predetermined distance. They both transmit the same amount of power, but a 90° phase difference between them is provided by means of a length difference in their supply lines.

The power divider is composed for example, of one or more hybrid rings.

FIG. 2 shows the feed structure F' of an antenna according to the invention which operates with circular polarization.

The same reference numerals have been used in this figure as to FIG. 1 for corresponding components.

The structure proper comprises a rectangular guide 1 for connecting the feeder to the primary radar, a matching guide 4, a circular guide 5 and a horn 6 which contains a polarizing member 60. Two probes 8 and 9 are arranged in diametrically opposite positions in a cylindrical section of the circular waveguide. These probes, the axes of which are inclined at 45° to the vertical, and therefore to the major surfaces of horn 6 are located in the path for the waves of the primary radar transceiver 2 and serve to extract the waves reflected at the front face of the horn during transmission, the extracted waves then being dissipated in absorbent loads connected to the probes. The probes are essential for satisfactory operation with this mode of polarization. For interrogation the probes are employed in the same way as in FIG. 1. To achieve this double function, a diplexer circuit 130 comprising filters and a power divider is arranged between the transmitter/receiver 15 and the probes. Coaxial lines 110, 120 and 140 provide a microwave connection between the probes and the diplexer on the one hand and between the diplexer and the transmitter/receiver 15 on the other. The diplexer separates the signals of the primary radar from the interrogation signals. The primary radar signals are dissipated in resistive matched loads 131 and 132.

A dielectric plate 16 is once again positioned in the circular guide 5. Its midplane contains the axis of the probes. The plane of polarization of the primary radar waves is perpendicular to the dielectric plate 16 so that only a component thereof is normal to the major horn surface.

When operating in the interrogation mode, the circular guide 5 is excited symmetrically by the collector probes 8 and 9. After passing through the polarizer 60 and the horn 6, the interrogation signals are radiated with elliptical polarization.

Transponders installed in aircraft are designed to transmit and receive waves with vertical linear polarization. The fact that the polarization of the wave radiated by the secondary radar is elliptical is no disadvantage. When calculating range it is simply assumed that the gain of the antenna being used is 3dB less than its nominal gain. In view of the increase in gain brought about by using the reflector of the primary radar antenna, this loss is of no importance.

Control operation is accomplished, as in FIG. 1, by two ancillary feeders 17 and 22 which are connected to the transmitter/receiver 15 by lines 18 and 19, power divider 20 and line 21.

As in the case of FIG. 1, each of the ancillary feeders comprises a pair of dipoles arranged on a metal base which serves as a reflector. The dipoles are of the half-wave type. The various characteristics of the dipoles (dimensions, distance from the reflecting plane, etc...) are calculated to achieve good matching and the correct radiation pattern.

FIG. 3 shows in solid lines the radiation pattern in azimuth for the interrogation channel and in broken lines the radiation pattern in azimuth for the control channel. The latter pattern provides good coverage of the secondary lobes of the interrogation diagram.

Figure 4:
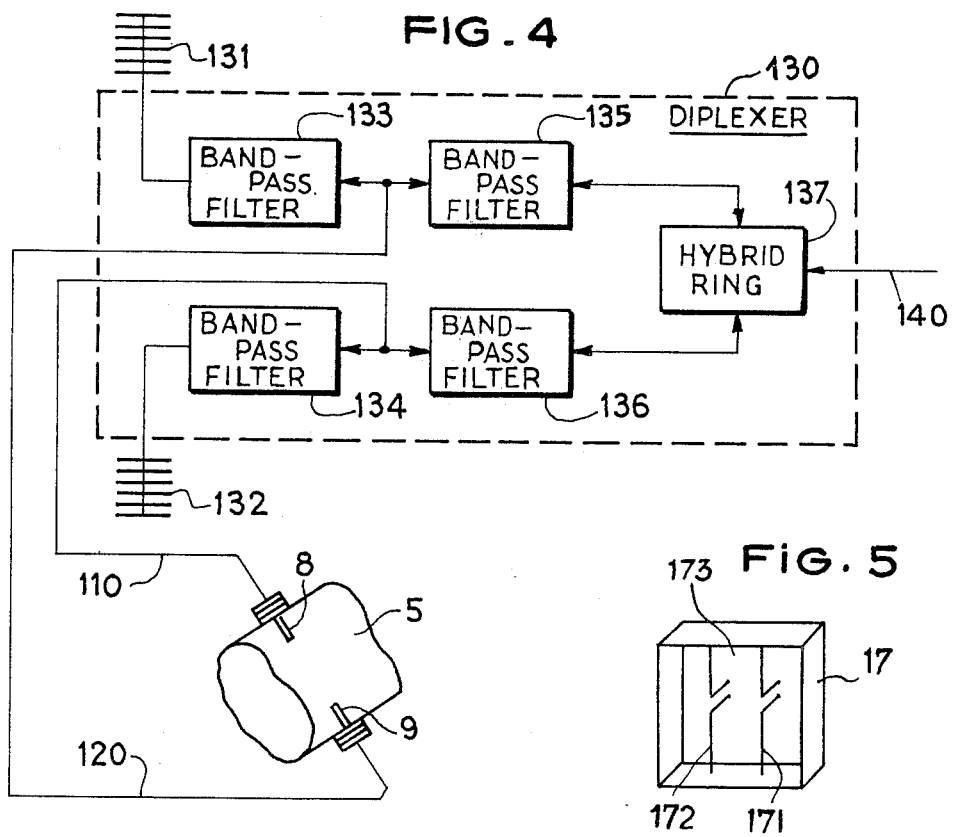
FIG. 4 is a block diagram of a diplexer for the interrogation signals included in the system of FIG. 2.

FIG. 4 is a diagram of the diplexer 130 of FIG. 2. This diplexer enables the collector probes 8 and 9 to be connected on the one hand to matched loads 131 and 132 for dissipating the primary radar signals picked up and on the other hand to the transmitter/receiver 15 for the interrogation signals.

It comprises two band-pass filters 133 and 134 whose center frequency is the operating frequency of the primary radar and two band-pass filters 135 and 136 whose center frequency is the interrogation frequency, the junction of each pair of filters being respectively connected to the probes 9 and 8 via lines 120 and 110. The outputs of filters 133 and 134 are connected to the matched loads 131 and 132 which dissipate energy reflected at the opening of the horn 6. The other filters 135 and 136 are connected to two terminals of a power divider 137, the third terminal of which is connected to the transmitter/receiver 15 via line 140.

The disposition of the probes diametrically opposite one another in the circular guide 5 makes it necessary that there to be a phase difference of 180° between the two channels which feed them. This difference is produced by the divider itself. The divider is a conventional hybrid ring. The complete hybrid circuit 130 may be produced as a photo-engraved three-layer circuit which is then enclosed by molding to seal it.

For secondary radar antennas reference can be made to Chapter 38 of Skolnik's Radar Handbook, Mac Graw Hill Book Company, 1970.

What is claimed is:

1. In a radar system, in combination:
   a primary radar transceiver;
   a secondary radar transceiver;
   a reflector;
   a primary feeder at the focus of said reflector comprising, in succession, a rectangular waveguide connected to the primary radar transceiver for carrying high-frequency wave energy therebetween, a matching waveguide, a circular waveguide with a cylindrical section, and a rectangular horn extending from said circular waveguide toward said reflector;
   two probes arranged at diametrically opposite locations in said cylindrical section, said probes having a common axis which includes an angle of not more than about 45° with the planes of the major sides of the rectangular horn, said probes being connected to the secondary radar transceiver for exchanging interrogation signals therewith;
   two ancillary feeders facing said reflector in symmetrical positions on opposite sides of the rectangular horn; and
   a power divider inserted between the secondary radar transceiver and said ancillary feeders for supplying same with phase-opposed control signals to be radiated toward said reflector.

2. The combination defined in claim 1 wherein said matching waveguide is adapted to feed linearly polarized waves in a plane parallel to said major sides of said primary radar transceiver to said circular waveguide, said common axis being parallel to the planes of said major sides.

3. The combination defined in claim 1 wherein said matching waveguide is adapted to feed circularly polarized waves from said primary radar transceiver to said circular waveguide, said common axis being inclined to said major sides at an angle of 45°.

4. The combination defined in claim 1 wherein said common axis is inclined with reference to said major sides, further comprising diplexer means inserted between said probes and said secondary radar transceiver for separating said interrogation signals from high-frequency wave energy extracted by said probes, and absorbent load means connected to said diplexer means for dissipating said extracted wave energy.

5. The combination defined in claim 4 wherein said interrogation signals are of a frequency different from that of said high-frequency wave energy, said diplexer means comprising first filter means for passing said extracted wave energy to said load means and second filter means for blocking the transmission of said extracted wave energy to said secondary radar transceiver.

6. The combination defined in claim 5 wherein said first and second filter means each comprises a pair of filters, said diplexer means further including power-dividing circuitry between said second filter means and said secondary radar transceiver.

7. The combination defined in claim 6 wherein said power-dividing circuitry comprises a hybrid ring.

8. The combination defined in claim 1 wherein said interrogation signals have a frequency lower than that of said high-frequency wave energy, further comprising a flat dielectric plate inserted in said cylindrical section with major faces parallel to said common axis and with a midplane including said common axis.

9. The combination defined in claim 8 wherein said plate has a longitudinal dimension in the axial direction of said cylindrical section.

10. The combination defined in claim 9 wherein said plate has a curved end proximal to said horn.

* * * * *